(12) United States Patent
Zeng

(10) Patent No.: US 6,810,093 B1
(45) Date of Patent: Oct. 26, 2004

(54) SEQUENCE DETECTION

(75) Inventor: Chaohuang Zeng, Sunnyvale, CA (US)

(73) Assignee: Atheros Communications, Inc., Sunnyvale, CA (US)

(*) Notice: Subject to any disclaimer, the term of this patent is extended or adjusted under 35 U.S.C. 154(b) by 186 days.

(21) Appl. No.: 10/139,613

(22) Filed: May 3, 2002

(51) Int. Cl.[7] .................................................. H04L 27/06
(52) U.S. Cl. ...................................... 375/340; 375/343
(58) Field of Search ................................. 375/343, 340, 375/341, 142, 143, 144, 147, 148, 150, 152, 316

(56) References Cited

U.S. PATENT DOCUMENTS

| | | | | |
|---|---|---|---|---|
| 5,363,412 A | * | 11/1994 | Love et al. .................. | 375/341 |
| 5,414,729 A | * | 5/1995 | Fenton ........................ | 375/149 |
| 5,506,861 A | * | 4/1996 | Bottomley .................. | 370/441 |
| 5,533,066 A | * | 7/1996 | Yamaguchi et al. ........ | 375/341 |
| 5,790,606 A | * | 8/1998 | Dent ........................... | 375/348 |
| 6,018,546 A | * | 1/2000 | Rege ........................... | 375/341 |
| 6,111,910 A | * | 8/2000 | Cui et al. .................... | 375/142 |
| 6,130,920 A | * | 10/2000 | Powell et al. ............... | 375/343 |
| 6,148,041 A | * | 11/2000 | Dent ........................... | 375/340 |
| 6,233,273 B1 | * | 5/2001 | Webster et al. ............. | 375/148 |
| 6,363,104 B1 | * | 3/2002 | Bottomley .................. | 375/148 |
| 6,477,680 B2 | * | 11/2002 | Mujtaba ...................... | 714/795 |
| 6,556,632 B1 | * | 4/2003 | Kubo et al. ................. | 375/341 |
| 6,614,836 B1 | * | 9/2003 | Halford et al. ............. | 375/152 |
| 6,690,715 B2 | * | 2/2004 | Webster et al. ............. | 375/148 |

OTHER PUBLICATIONS

IEEE Std 802.11b/D8.0, Sep. 2001.
Proakis, John G., "Digital Communications" Third Edition, pp. 583–593.

* cited by examiner

*Primary Examiner*—Tesfaldet Bocure
(74) *Attorney, Agent, or Firm*—Van Pelt & Yi LLP

(57) ABSTRACT

A system and method are disclosed for recovering a current data symbol that is part of a sequence of data symbols from a received signal. Recovering the current data symbol includes determining a set of candidate current data symbols from a set of possible current data symbols wherein the set of candidate current data symbols is a subset of the possible current data symbols that does not include all of the possible current data symbols; determining a set of candidate data symbol sequences wherein each candidate data symbol sequence includes one of the candidate current data symbols; and selecting a recovered data symbol sequence that matches the received signal from the set of candidate data symbol sequences.

29 Claims, 3 Drawing Sheets

Prev Symbol   Current Symbol   Next Symbol

SEQUENCE DETECTION

FIELD OF THE INVENTION

The present invention relates generally to recovery of a data signal. More specifically, sequence detection for encoded transmitted data is disclosed.

BACKGROUND OF THE INVENTION

FIG. 1 is a block diagram illustrating a typical communication system. Data to be transmitted is scrambled by scrambler 102 and encoded by data encoder 104. The encoded data is transmitted through physical medium 106 and then decoded by decoder 108 and descrambled by descrambler 110.

In general, the physical medium used for transmission is not perfect and thus distorts the transmitted signal. One common impairment is multipath distortion, where the signal travels along different paths and arrives at the receiver at different times. Because of the time delay, different symbols can potentially arrive at the same time and cause intersymbol interference (ISI). Another impairment is the background noise that relates to the receiver front end circuit.

To combat the multipath effect, many systems use a coding scheme to mitigate the detrimental effect. For example, in IEEE 802.11b, a CCK coding scheme is used. Other block codes are used in other systems. The transmitted sequence of symbols is recovered at the receiver by determining a sequence of symbols that best matches the received symbol from a set of possible symbol sequences. When the number of possible symbols is large, as it is for IEEE 802.11b operating at 11 Mbps as described below, the number of combinations of possible symbol sequences to be considered becomes very large for reasonable symbol sequence lengths. As a result, the process of considering possible combinations of symbols becomes complex and time consuming. It would be of great benefit if a better technique could be developed for determining transmitted symbols in a communication system.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1:
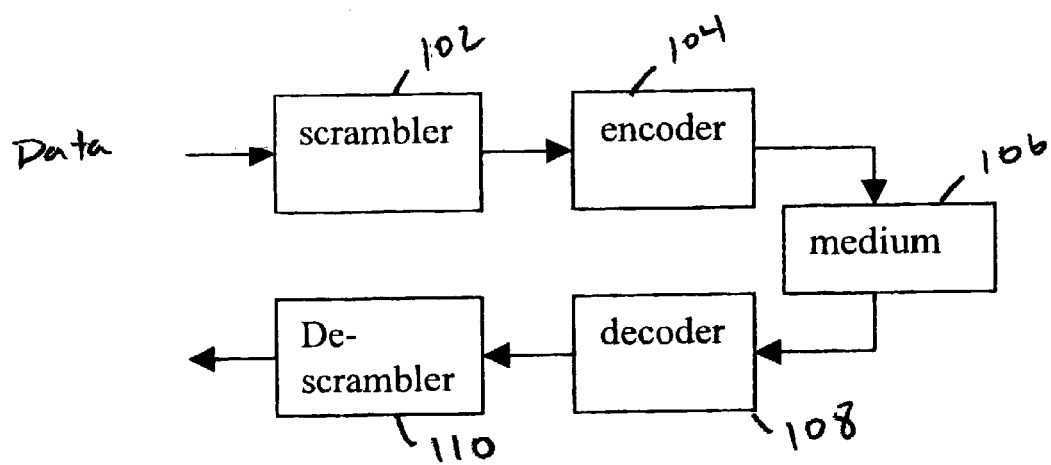
FIG. 1 is a block diagram illustrating a typical communication system.

It should be appreciated that the present invention can be implemented in numerous ways, including as a process, an apparatus, a system, or a computer readable medium such as a computer readable storage medium or a computer network wherein program instructions are sent over optical or electronic communication links. It should be noted that the order of the steps of disclosed processes may be altered within the scope of the invention.

A detailed description of one or more preferred embodiments of the invention are provided below along with accompanying figures that illustrate by way of example the principles of the invention. While the invention is described in connection with such embodiments, it should be understood that the invention is not limited to any embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

For the purpose of example, an embodiment is described in detail wherein data is encoded by a transmitter using the coding scheme described in IEEE standard 802.11b, which is hereby incorporated by reference. For data rates of 5.5 Mbps and 11 Mbps, the standard uses complementary code keying (CCK) for data modulation/encoding. In the receiver, the received signal is decoded correspondingly. The 11 Mbps version of the standard is described in detail below. It should be noted that in another embodiment, the 5.5 Mbps version is implemented, and in other embodiments, other coding schemes are implemented in connection with the sequence detection techniques disclosed below.

CCK code words have the following format:

$$c=\{c_0 \ldots c_7\}=\{e^{j(\phi_1+\phi_2+\phi_3+\phi_4)}, e^{j(\phi_1+\phi_3+\phi_4)}, e^{j(\phi_1+\phi_2+\phi_4)}, -e^{j(\phi_1+\phi_4)}, e^{j(\phi_1+\phi_2+\phi_3)}, e^{j(\phi_1+\phi_3)}, -e^{j(\phi_1+\phi_2)}, e^{j\phi_1}\}$$

which contains 8 terms, where $c_0$ transmits first in time. The phase terms: $\phi_1$, $\phi_2$, $\phi_3$ and $\phi_4$ depends on the transmitted data. For an example of 11 Mbps in 802.11b, 8 data bits (d0 to d7) are grouped into one symbol. The first dibits (d0,d1) encode $\phi_1$ based on differential quadrature phase shift keying (DQPSK). The data bits (d2, d3), (d4, d5), and (d6, d7) encode $\phi_2$, $\phi_3$, and $\phi_4$, respectively, based on QPSK as given in Table 1.

TABLE 1

QPSK Encoding Table

| Dibit pattern [di, d(i + 1)] (di is transmitted first in time) | phase |
|---|---|
| 00 | 0 |
| 01 | $\pi/2$ |
| 10 | $\pi$ |
| 11 | $-\pi/2$ |

In summary, 8 input bits are mapped to CCK code words before they are transmitted. For 11 Mbps transmissions, there are $2^8=256$ different code words, each of which corresponds to a particular symbol (8 bits). In the receiver, the transmitted symbol is recovered and then de-mapped to decode the transmitted bits. To account for intersymbol interference, possible sequences of symbols that include a previously transmitted symbol and a next transmitted symbol are considered for the purpose of determining each transmitted symbol.

Figure 2:
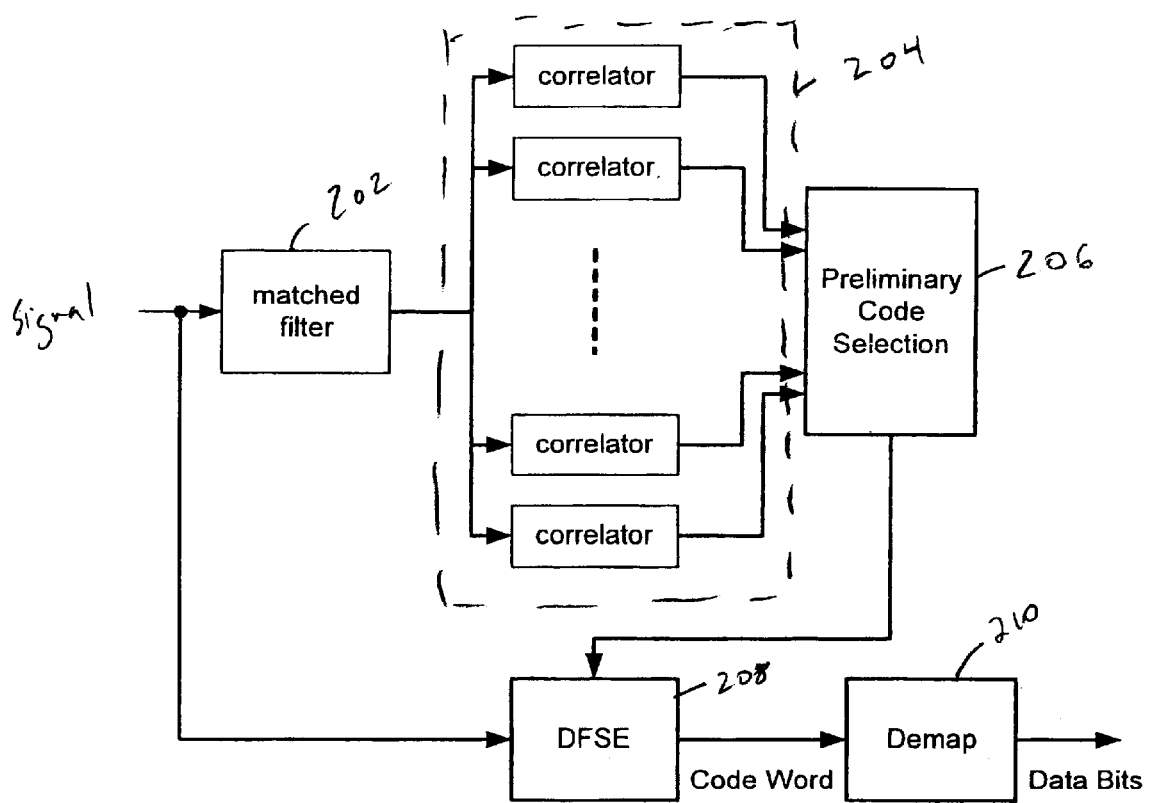
FIG. 2 is a block diagram illustrating a receiver structure used in one embodiment.

FIG. 2 is a block diagram illustrating a receiver structure used in one embodiment. The received signal passes through matched filter 202, which is the conjugate and time reverse of the channel response. The filtered signal is then correlated with possible symbols in correlation block 204. In some embodiments, the filtered signal is compared to all possible symbols and in some embodiments, the filtered signal is compared to a subset of possible symbols as is described below. A parallel correlation architecture is shown in block 204. In other embodiments, a serial architecture may be implemented. Correlation may be performed by multiplying the received signal within one symbol with the conjugate of each symbol.

The correlation outputs for each potential symbol are compared by preliminary code selector 206. Preliminary code selector 206 determines a set of candidate symbols from the set of potential symbols based on a criterion that is applied to the correlation results from correlation block 204. The criterion is designed to select candidate symbols that are the most likely matches to the transmitted symbol. In one embodiment, the criterion is based on the magnitude of the correlator output. In other embodiments, the criterion is based on other properties of the correlator output.

In one embodiment where the 11 Mbps version of the IEEE 802.11b standard is implemented, preliminary code selector 206 may be efficiently implemented by taking into consideration the fact that the 256 symbols include 4 phase shifted versions of 64 base symbols. Preliminary code selector 206 is implemented in one embodiment to first compare the magnitude of the correlation of one symbol period of received signal with each of the 64 base symbols and then to compare the real part of the correlation of each phase shifted version of the 6 best base symbols. In other embodiments, the number of base symbols may be varied as is appropriate.

The candidate symbols determined by preliminary code selector 206 are output to decision feedback sequence detection (DFSE) block 208 to be included in candidate recovered symbol sequences. DFSE 208 compares candidate recovered symbol sequences to select the recovered symbol sequence. The elimination of possible symbols not included in the set of candidate symbols by preliminary code selector 206 simplifies the operation of the DFSE. For example, in the CCK encoding scheme at 11 Mbps in 802.11b, there are 256 possible symbols for each transmitted code word. Preliminary selection block 206 narrows the possible symbols to a set of most likely candidate symbols.

Figure 3:
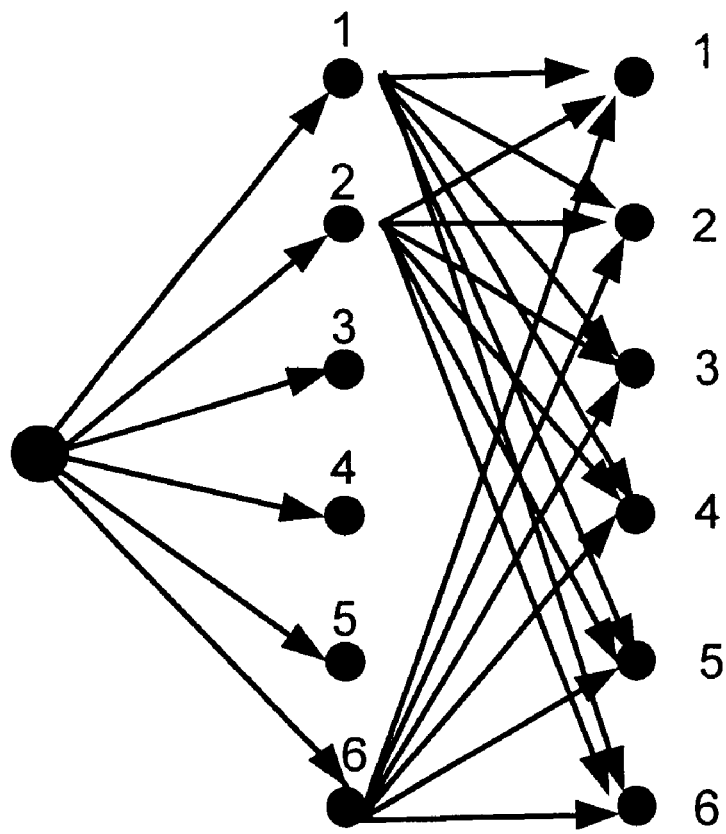
FIG. 3 is a trellis diagram illustrating the candidate sequences considered by the DFSE in one embodiment.

FIG. 3 is a trellis diagram illustrating the candidate sequences considered by the DFSE in one embodiment. In the example shown, 6 symbols are selected by preliminary code selector 206. The DFSE compares sequences that include three symbols: the current symbol being determined, the previous symbol, and the next symbol. The previously determined symbol is combined with each of the 6 current candidate symbols determined by preliminary code selector 206 and 6 candidate symbols determined by preliminary code selector 206 for the next symbol. By narrowing the number of possible symbols from 256 possible symbols to 6 candidate symbols for the current symbol and the next symbol, the number of candidate sequences to be considered is reduced from $256^2$ to $6^2$. It should be noted that using a previously determined symbol as the previous symbol instead of considering a set of candidate symbols for the previous symbol reduces the number of sequences as well.

Thus, it is apparent that reducing the number of possible individual symbols to a smaller number of candidate symbols based on individual correlations of the symbols greatly reduces the number of candidate sequences that must be considered by the DFSE. The effect is strong in the case shown where sequences of 3 symbols are considered and the effect is even stronger when longer sequences of symbols are considered by the DFSE. Thus, the preliminary code selector 206 may facilitate the use of a DFSE that considers intersymbol interference not just from the previous symbol and the next symbol, but also from symbols removed by one or more additional symbol periods.

Each candidate sequence of symbols is passed through the estimated channel in the reconstruction process and compared to the received signal. The closest candidate sequence is determined to be the most likely transmitted sequence and the current symbol in the closest candidate sequence is determined to be the current recovered symbol. One preferred metric to determine the closest candidate sequence is the smallest Euclidean distance between the reconstructed signal and the received signal. The benefit realized by decreasing the number of candidate sequences considered in the reconstruction process is significant.

An improved sequence detection technique has been disclosed. A preliminary code selector narrows a number of possible current and next symbols to a smaller number of candidate current and next symbols. This reduces the number of possible sequences that must be reconstructed and compared to the received signal to recover the current symbol. It should be noted that the disclosed sequence detection technique may also be applied to other types of data channels, such as a data storage data channel, as well as a communication data channel.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A method of recovering a current data symbol that is part of a sequence of data symbols from a received signal comprising:

determining a set of candidate current data symbols from a set of possible current data symbols wherein the set of candidate current data symbols is a subset of the possible current data symbols that does not include all of the possible current data symbols;

determining a set of candidate data symbol sequences wherein each candidate data symbol sequence includes one of the candidate current data symbols;

comparing the received signal and the set of candidate data symbol sequences; and selecting a recovered data symbol sequence that matches the received signal from the set of candidate data symbol sequences.

2. A method of recovering a current data symbol as recited in claim 1 further including selecting the candidate current data symbol that is included in the recovered data symbol sequence as the recovered current data symbol.

3. A method of recovering a current data symbol as recited in claim 1 wherein determining a set of candidate current data symbols from a set of possible current data symbols includes correlating all of the possible current data symbols with one symbol period of the received signal.

4. A method of recovering a current data symbol as recited in claim 1 wherein determining a set of candidate current data symbols from a set of possible current data symbols includes correlating a subset of the possible current data symbols with one symbol period of the received signal.

5. A method of recovering a current data symbol as recited in claim 1 wherein determining a set of candidate current data symbols from a set of possible current data symbols includes correlating possible current data symbols with one symbol period of the received signal.

6. A method of recovering a current data symbol as recited in claim 1 wherein determining a set of candidate current data symbols from a set of possible current data symbols includes correlating possible current data symbols with one symbol period of the received signal and wherein data symbols selected to be included in the set of candidate current data symbols have higher correlation values than data symbols that are not selected to be included in the set of candidate current data symbols.

7. A method of recovering a current data symbol as recited in claim 1 wherein each candidate data symbol sequence includes a previous symbol, a candidate current symbol, and a next symbol.

8. A method of recovering a current data symbol as recited in claim 1 wherein each candidate data symbol sequence includes a previous symbol, a candidate current symbol, and a next symbol and wherein the previous symbol is previously determined.

9. A method of recovering a current data symbol as recited in claim 1 wherein each candidate data symbol sequence includes a previous symbol, a candidate current symbol, and a next symbol and wherein the next symbol is selected from a set of candidate next symbols that is a subset of a set of possible next symbols.

10. A method of recovering a current data symbol as recited in claim 1 wherein each candidate data symbol sequence is reconstructed by passing through an estimated channel and compared with the received signal.

11. A method of recovering a current data symbol as recited in claim 1 wherein each candidate data symbol sequence is reconstructed by passing through an estimated channel and compared with the received signal and wherein the recovered data symbol sequence is the candidate data symbol sequence results in the smallest distance from the received signal.

12. A method of recovering a current data symbol as recited in claim 1, wherein comparing the received signal and the set of candidate data symbol sequences includes deriving a derived signal from each of the set of candidate data symbol sequences and comparing the derived signal with the input signal.

13. A method of recovering a current data symbol as recited in claim 1, wherein comparing the received signal and the set of candidate data symbol sequences includes deriving a derived symbol sequence from the input signal and comparing the derived symbol sequence with each of the set of candidate data symbol sequences.

14. A receiver for recovering a current data symbol that is part of a sequence of data symbols from a received signal comprising:
a preliminary code selector block configured to determine a set of candidate current data symbols from a set of possible current data symbols wherein the set of candidate current data symbols is a subset of the possible current data symbols that does not include all of the possible current data symbols;
a DFSE configured to compare the received signal and the set of candidate data symbol sequences and to select a recovered data symbol sequence that matches the received signal from a set of candidate data symbol sequences wherein each candidate data symbol sequence includes one of the candidate current data symbols.

15. A receiver for recovering a current data symbol as recited in claim 14 wherein the candidate current data symbol that is included in the recovered data symbol sequence is selected as the recovered current data symbol.

16. A receiver for recovering a current data symbol as recited in claim 14 wherein the preliminary code selector block includes a correlator.

17. A receiver for recovering a current data symbol as recited in claim 14 wherein the preliminary code selector block includes a plurality of correlators arranged in parallel.

18. A receiver for recovering a current data symbol as recited in claim 14 wherein the preliminary code selector block correlates possible current data symbols with one symbol period of the received signal and wherein data symbols in the set of candidate current data symbols have higher correlation values than data symbols that are not in the set of candidate current data symbols.

19. A receiver for recovering a current data symbol as recited in claim 14 wherein each candidate data symbol sequence includes a previous symbol, a candidate current symbol, and a next symbol.

20. A receiver for recovering a current data symbol as recited in claim 14 wherein each candidate data symbol sequence includes a previous symbol, a candidate current symbol, and a next symbol and wherein the previous symbol is previously determined.

21. A receiver for recovering a current data symbol as recited in claim 14 wherein each candidate data symbol sequence includes a previous symbol, a candidate current symbol, and a next symbol and wherein the next symbol is selected from a set of candidate next symbols that is a subset of a set of possible next symbols.

22. A receiver for recovering a current data symbol as recited in claim 14 wherein each candidate data symbol sequence is reconstructed by passing through an estimated channel and compared with the received signal.

23. A receiver for recovering a current data symbol as recited in claim 14 wherein each candidate data symbol sequence is reconstructed by passing through an estimated channel and compared with the received signal and wherein the recovered data symbol sequence is the candidate data symbol sequence results in the smallest distance from the received signal.

24. A receiver for recovering a current data symbol as recited in claim 14 further including a matched filter.

25. A receiver for recovering a current data symbol as recited in claim 14, wherein the DFSE is configured to compare the received signal and the set of candidate data symbol sequences by deriving a derived signal from each of the set of candidate data symbol sequences and comparing the derived signal with the input signal.

26. A receiver for recovering a current data symbol as recited in claim 14, wherein the DFSE is configured to compare the received signal and the set of candidate data symbol sequences by deriving a derived symbol sequence from the input signal and comparing the derived signal with the input signal.

27. A computer program product for recovering a current data symbol that is part of a sequence of data symbols from a received signal, the computer program product being embodied in a computer readable medium and comprising computer instructions for:

determining a set of candidate current data symbols from a set of possible current data symbols wherein the set of candidate current data symbols is a subset of the possible current data symbols that does not include all of the possible current data symbols;

determining a set of candidate data symbol sequences wherein each candidate data symbol sequence includes one of the candidate current data symbols;

comparing the received signal and the set of candidate data symbol sequences; and selecting a recovered data symbol sequence that matches the received signal from the set of candidate data symbol sequences.

28. A computer program product as recited in claim 27, wherein comparing the received signal and the set of candidate data symbol sequences includes deriving a derived signal from each of the set of candidate data symbol sequences and comparing the derived signal with the input signal.

29. A computer program product as recited in claim 27, wherein comparing the received signal and the set of candidate data symbol sequences includes deriving a derived symbol sequence from the input signal and comparing the derived symbol sequence with each of the set of candidate data symbol sequences.

* * * * *